United States Patent
Xu et al.

(10) Patent No.: US 11,234,214 B2
(45) Date of Patent: Jan. 25, 2022

(54) METHOD AND APPARATUS FOR PROVIDING BROADCAST/MULTICAST SERVICES

(71) Applicant: NOKIA TECHNOLOGIES OY, Espoo (FI)

(72) Inventors: Xiang Xu, Jiangsu (CN); Devaki Chandramouli, Plano, TX (US); David Navratil, Helsinki (FI); Curt Wong, Bellevue, WA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 51 days.

(21) Appl. No.: 16/096,081

(22) PCT Filed: Apr. 28, 2016

(86) PCT No.: PCT/CN2016/080499
§ 371 (c)(1),
(2) Date: Oct. 24, 2018

(87) PCT Pub. No.: WO2017/185293
PCT Pub. Date: Nov. 2, 2017

(65) Prior Publication Data
US 2019/0124623 A1    Apr. 25, 2019

(51) Int. Cl.
*H04W 72/00*  (2009.01)
*H04W 76/40*  (2018.01)
*H04W 84/04*  (2009.01)

(52) U.S. Cl.
CPC ......... *H04W 72/005* (2013.01); *H04W 76/40* (2018.02); *H04W 84/042* (2013.01)

(58) Field of Classification Search
CPC ..... H04W 76/20; H04W 72/005; H04W 4/06; H04W 76/10; H04W 36/0007;
(Continued)

(56) References Cited

U.S. PATENT DOCUMENTS

2008/0287057 A1   11/2008   Zisimopoulos
2011/0149831 A1*  6/2011    Hyun ............... H04W 76/40
                                              370/312
(Continued)

FOREIGN PATENT DOCUMENTS

CN    101808279 A    8/2010
CN    104067667 A    9/2014
(Continued)

OTHER PUBLICATIONS

Oct. 21, 2019 Office Action issued in Japanese Patent Application No. 2018-556807.
(Continued)

*Primary Examiner* — Elton Williams
(74) *Attorney, Agent, or Firm* — Squire Patton Boggs (US) LLP

(57) ABSTRACT

Embodiments of the present disclosure provide methods, apparatus and computer program products for providing broadcast/multicast services. A method at least partially implemented at an application server comprises transmitting a resource request message to a first broadcast/multicast control node (BM-CN), requesting an allocation of broadcast resource for delivering a multimedia broadcast/multicast service (MBMS) user service; transmitting a further resource request message to a second BM-CN, requesting a further allocation of broadcast resource for delivering the MBMS user service; receiving a first response message from the first BM-CN and a second response message from the second BM-CN, the first response message indicating a first broadcast resource allocated by the first BM-CN for the MBMS user service, and the second response message indicating a second broadcast resource allocated by the second BM-CN for the MBMS user service; and indicating information about the second broadcast resource to the first BM-CN and/or indicating information about the first broad- (Continued)

cast resource to the second BM-CN. Methods at the BM-CN and a RAN network node, and corresponding apparatus are also provided.

10 Claims, 8 Drawing Sheets

(58) Field of Classification Search
CPC .... H04W 48/10; H04L 61/2069; H04L 12/18; H04L 12/1845; H04L 12/185; H04L 29/12292; H04N 21/6405
See application file for complete search history.

(56) References Cited

U.S. PATENT DOCUMENTS

| | | |
|---|---|---|
| 2015/0078245 A1 | 3/2015 | Anchan |
| 2015/0119023 A1* | 4/2015 | Wang ................. H04W 72/005 455/432.1 |

FOREIGN PATENT DOCUMENTS

| | | |
|---|---|---|
| WO | WO 2015/140611 A1 | 9/2015 |
| WO | 2016020019 A1 | 2/2016 |

OTHER PUBLICATIONS

Oct. 31, 2019 Extended Search Report issued in European Patent Application No. 16899806.0.

International Search Report & Written Opinion dated Dec. 29, 2016 corresponding to International Patent Application No. PCT/CN2016/080499.

Intel Corporation, "Discussion on multi-cell multicast/broadcast enhancements for V2V communication," 3GPP Draft; R1-162374, 3GPP TSG RAN WG1 Meeting #84bis, Busan, Korea, Apr. 15, 2016.

* cited by examiner

METHOD AND APPARATUS FOR PROVIDING BROADCAST/MULTICAST SERVICES

TECHNICAL FIELD

The non-limiting and example embodiments of the present disclosure generally relate to the technical field of wireless communications, and specifically to methods, apparatuses and computer programs for providing broadcast/multicast services.

BACKGROUND

This section introduces aspects that may facilitate a better understanding of the disclosure. Accordingly, the statements of this section are to be read in this light and are not to be understood as admissions about what is in the prior art or what is not in the prior art.

Some of the abbreviations used in the disclosure are listed in the following:
3GPP Third generation Partnership Project
V2X Vehicle-to-X
V2V Vehicle-to-Vehicle
V2P Vehicle-to-Pedestrian
MBMS Multimedia Broadcast/Multicast Service
MBSFN MBMS Single-Frequency Network
TMGI Temporary Mobile Group Identity
LTE Long Term Evolution
eNB Evolved NodeB
UE User Equipment
AS Application Server
GCS Group Communication Service
GCSE Group Communication Service Enabler
MCPTT Mission Critical Push To Talk
ECGI E-UTRAN Cell Global Identifier
BM-SC Broadcast Multicast-Service Centre
Rel- Release- Compared with unicast communication, MBMS service enables to broadcast/multicast data to a group of terminal devices in a resource efficient way. 3GPP has defined a Group Communication Service Enabler (GCSE) architecture with evolved MBMS (eMBMS) in Long Term Evolution (LTE) Release 12 (Rel-12), and detailed description for the GCSE architecture can be found, for example, in the 3GPP specification TS 23.246 (V 13.0.0).

MBMS is considered to be useful in V2X uses cases. V2X communication may include any combination of direct communication between vehicles, pedestrians and infrastructure. For example, the V2X may include Vehicle-to-Vehicle (V2V), or Vehicle-to-Pedestrian (V2P) communication. In LTE Rel-14, 3GPP Service and System Aspect 2 (SA2) working group is currently studying on an overall V2X architecture in TR 23.785 (V 0.2.0) for LTE Rel-14. One study area is related to V2X message transmission for V2V and V2P services by reusing the GCSE architecture, with a V2X AS acting as a GCS AS.

In this disclosure, methods, apparatus and computer programs are provided for providing broadcast/multicast services. Though some embodiments could be applied to a V2X with eMBMS scenario, embodiments of the disclosure are not limited thereto, but could be more widely applied to a general multicast/broadcast scenario.

SUMMARY

Various embodiments of the present disclosure mainly aim at providing methods, apparatus and computer programs for providing broadcast/multicast services. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method at least partially implemented at an application server. The method comprises transmitting a resource request message to a first broadcast/multicast control node (BM-CN), requesting an allocation of broadcast resource for delivering a multimedia broadcast/multicast service (MBMS) user service; transmitting a further resource request message to a second BM-CN, requesting a further allocation of broadcast resource for delivering the MBMS user service; receiving a first response message from the first BM-CN and a second response message from the second BM-CN, the first response message indicating a first broadcast resource allocated by the first BM-CN for the MBMS user service, and the second response message indicating a second broadcast resource allocated by the second BM-CN for the MBMS user service; and indicating information about the second broadcast resource to the first BM-CN and/or indicating information about the first broadcast resource to the second BM-CN.

In one embodiment, the first BM-CN and the second BM-CN may be a same BM-CN. In another embodiment, the first BM-CN may belong to a first public land mobile network (PLMN) and the second BM-CN may belong to a different second PLMN, or, the first BM-CN may serve a first MBMS service area, and the second BM-CN may serve a second MBMS service area at least partially overlapping with the first MBMS service area.

In one embodiment, said indicating information about the second broadcast resource to the first BM-CN and/or indicating information about the first broadcast resource to the second BM-CN may comprise: indicating a first temporary mobile group identity (TMGI) for identifying the first broadcast resource and a second TMGI for identifying the second broadcast resource to the first BM-CN and/or the second BM-CN.

In another embodiment, said indicating information about the second broadcast resource to the first BM-CN and/or indicating information about the first broadcast resource to the second BM-CN may comprise: including the information about the second broadcast resource into a first Activate MBMS Bearer Request message as a new information element (IE), and transmitting the first Activate MBMS Bearer Request message to the first BM-CN; and/or including the information about the first broadcast resource into a second Activate MBMS Bearer Request message as a new IE, and transmitting the second Activate MBMS Bearer Request message to the second BM-CN. In another embodiment, alternatively, the information about the second/first broadcast resource may be sent by using an existing IE of an existing message.

In a second aspect of the disclosure, there is provided a method at least partially implemented at a first broadcast/multicast control node (BM-CN), comprising: receiving a request from an application server for the first BM-CN to allocate broadcast resource for delivering a multimedia broadcast/multicast service (MBMS) user service; sending a message to the application server in response to the received request, the message indicating a first broadcast resource allocated by the first BM-CN for the MBMS user service; receiving, from the application server, information about a second broadcast resource allocated by a second BM-CN for the MBMS user service; and indicating information about the first broadcast resource and the second broadcast resource for the MBMS user service to a radio access network (RAN) shared by the first BM-CN and the second BM-CN.

In one embodiment, the first BM-CN and the second BM-CN may be a same BM-CN. In another embodiment, the first BM-CN may belong to a first PLMN and the second BM-CN may belong to a different second PLMN, or the first BM-CN may serve a first MBMS service area, and the second BM-CN may serve a second MBMS service area at least partially overlapping with the first MBMS service area.

In one embodiment, receiving, from the application server, information about a second broadcast resource allocated by a second BM-CN for the MBMS user service may comprise: receiving a first temporary mobile group identity (TMGI) for identifying the first broadcast resource and a second TMGI for identifying the second broadcast resource from the application server. In another embodiment, receiving, from the application server, information about a second broadcast resource allocated by a second BM-CN for the MBMS user service may comprise: receiving the information about the second broadcast resource via a new information element (IE) in a first Activate MBMS Bearer Request message from the application server. In another embodiment, alternatively, the information about the second/first broadcast resource may be received via an existing IE of an existing message.

In still another embodiment, indicating information about the first broadcast resource and the second broadcast resource for the MBMS user service to the RAN may comprise: indicating the information about the first broadcast resource and the second broadcast resource for the MBMS user service to a base station or a multi-cell/multicast coordination entity (MCE) of the RAN, via a MBMS Session Start Request or MBMS Session Update Request message. In a further embodiment, indicating information about the first broadcast resource and the second broadcast resource for the MBMS user service to the RAN may further comprise: indicating the information about the first broadcast resource and the second broadcast resource for the MBMS user service to a terminal device of the RAN.

In a third aspect of the present disclosure, there is provided a method at least partially implemented at a first network node of a radio access network (RAN). The method comprises receiving, from a first broadcast/multicast control node (BM-CN), a first message for starting a first multimedia broadcast/multicast service (MBMS) session; receiving, from a second BM-CN, a second message for starting a second MBMS session; detecting that the first MBMS session and the second MBMS session relate to a same MBMS user service; determining whether a single core network user plane connection and a single broadcast radio bearer can be established for the first and second MBMS sessions; and broadcasting data of the same MBMS user service over the single broadcast radio bearer to terminal devices, based on a positive result of the determination.

In one embodiment, the detecting may be based on an indication included in at least one of the first message and the second message, the indication indicating a broadcast resource allocated by one of the first BM-CN and the second BM-CN, and a further related broadcast resource allocated by the other of the first BM-CN and the second BM-CN for the same MBMS user service.

In another embodiment, the method may further comprise joining an Internet Protocol (IP) multicast group in response to receiving the first message.

In a fourth aspect of the present disclosure, there is provided a method at least partially implemented at a second network node of a radio access network (RAN). The method comprises receiving, from a first broadcast/multicast control node (BM-CN), a message for starting a first multimedia broadcast/multicast service (MBMS) session; receiving, from a second BM-CN, a further message for starting a second MBMS session; detecting that the first MBMS session and the second MBMS session relate to a same MBMS user service; determining whether a single core network user plane connection and a single broadcast radio bearer can be established for the first and second MBMS sessions; and ordering a base station to establish the single core network user plane connection and broadcast data from the single core network user plane connection over the single broadcast radio bearer to terminal devices, based on a positive result of the determination.

In a fifth aspect of the present disclosure, there is provided an apparatus at least partially implemented at an application server. The apparatus comprises a first resource request unit, configured to transmit a resource request message to a first broadcast/multicast control node (BM-CN), requesting an allocation of broadcast resource for delivering a multimedia broadcast/multicast service (MBMS) user service; a second resource request unit, configured to transmit a further resource request message to a second BM-CN, requesting a further allocation of broadcast resource for delivering the MBMS user service; a receiving unit, configured to receive a first response message from the first BM-CN and a second response message from the second BM-CN, the first response message indicating a first broadcast resource allocated by the first BM-CN for the MBMS user service, and the second response message indicating a second broadcast resource allocated by the second BM-CN for the MBMS user service; and an indication unit, configured to indicate information about the second broadcast resource to the first BM-CN and/or indicating information about the first broadcast resource to the second BM-CN.

In a sixth aspect of the present disclosure, there is provided an apparatus at least partially implemented at a first broadcast/multicast control node (BM-CN). The apparatus comprises a request receiving unit, configured to receive a request from an application server for the first BM-CN to allocate broadcast resource for delivering a multimedia broadcast/multicast service (MBMS) user service; a response unit, configured to send a message to the application server in response to the received request, the message indicating a first broadcast resource allocated by the first BM-CN for the MBMS user service; an information receiving unit, configured to receive, from the application server, information about a second broadcast resource allocated by a second BM-CN for the MBMS user service; and an informing unit, configured to indicate information about the first broadcast resource and the second broadcast resource for the MBMS user service to a radio access network (RAN) shared by the first BM-CN and the second BM-CN In a seventh aspect of the present disclosure, there is provided an apparatus at least partially implemented at a first network node of a radio access network (RAN). The apparatus comprises a first message receiving unit, configured to, from a first broadcast/multicast control node (BM-CN), a first message for starting a first multimedia broadcast/multicast service (MBMS) session; a second message receiving unit, configured to receive, from a second BM-CN, a second message for starting a second MBMS session; a detection unit, configured to detect that the first MBMS session and the second MBMS session relate to a same MBMS user service; a determination unit, configured to determine whether a single core network user plane connection and a single broadcast radio bearer can be established for the first and second MBMS sessions; and a broadcasting unit, configured to broadcast data of the same MBMS user service over the single broadcast radio bearer to terminal devices, based on a positive result of the determination.

In an eighth aspect of the present disclosure, there is provided an apparatus at least partially implemented at a second network node of a radio access network (RAN). The apparatus comprises a first receiving unit, configured to receive, from a first broadcast/multicast control node (BM-CN), a message for starting a first multimedia broadcast/multicast service (MBMS) session; a second receiving unit, configured to receive, from a second BM-CN, a further message for starting a second MBMS session; a detection unit, configured to detect that the first MBMS session and the second MBMS session relate to a same MBMS user service; a determining unit, configured to whether a single core network user plane connection and a single broadcast radio bearer can be established for the first and second MBMS sessions; and an ordering unit, configured to order a base station to establish the single core network user plane connection and broadcast data from the single core network user plane connection over the single broadcast radio bearer to terminal devices, based on a positive result of the determination.

In a ninth aspect of the present disclosure, there is provided an apparatus, the apparatus comprising at least one processor; and at least one memory including computer program code; the at least one memory and the computer program code configured to, with the at least one processor, cause the apparatus at least to perform any method according to the first, second, third, or fourth aspect of the present disclosure.

In a tenth aspect of the present disclosure, there is provided an apparatus, the apparatus comprising processing means adapted to perform any method according to the first, second, third, or fourth aspect of the present disclosure.

In an eleventh aspect of the disclosure, there is provided a computer program, comprising at least one computer readable non-transitory memory medium having program code stored thereon, the program code which, when executed by an apparatus, causes the apparatus to perform a method according to the first, second, third, or fourth aspect of the disclosure.

According to the various aspects and embodiments as mentioned above, efficiency of providing broadcast/multicast services can be improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
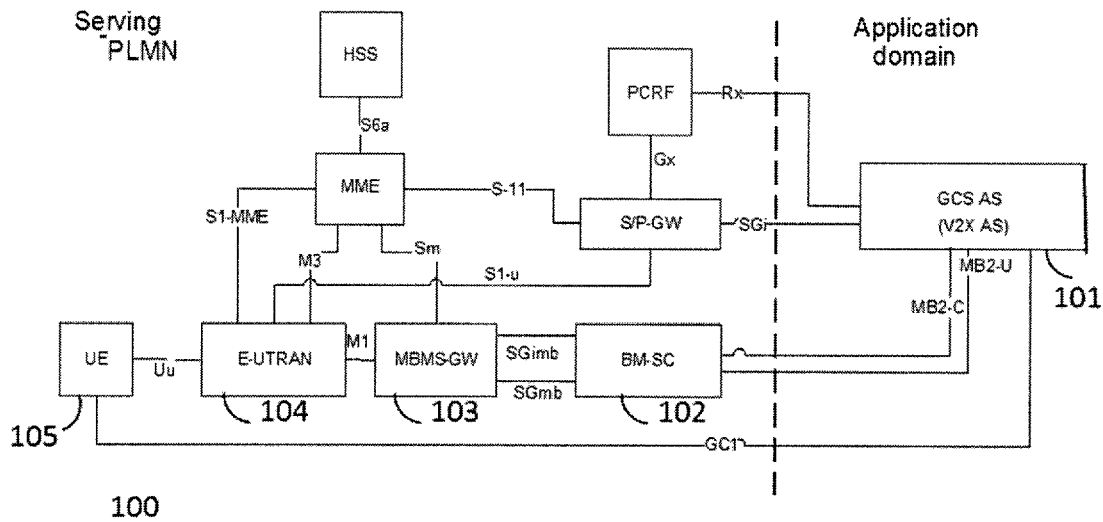
FIG. 1 illustrates an example network structure for V2X message transmission reusing the GCSE architecture.

Hereinafter, the principle and spirit of the present disclosure will be described with reference to illustrative embodiments. It should be understood that all these embodiments are given merely for one skilled in the art to better understand and further practice the present disclosure, not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "device" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "devices", "terminal device", "user equipment" and "UE" may be used interchangeably. Similarly, the term "base station" may represent a base station (BS), a node B (NodeB or NB), an evolved NodeB (eNodeB or eNB), a Remote Radio Unit (RRU), a radio head (RH), a remote radio head (RRH), a relay node (RN), a low power node (LPN) such as a femto, a pico, an access point (AP) and so forth.

For illustrative purposes, several embodiments of the present disclosure will be described in the context of a 3GPP LTE system. Those skilled in the art will appreciate, however, that the concept and principle of the several embodiments of the present disclosure may be more generally applied to other wireless networks, for example a third generation (3G) CDMA-based network or a future network (e.g., a fifth generation (5G) system).

The non-limiting and example embodiments of the present disclosure relate to broadcast/multicast communication. In an LTE system, the broadcast/multicast communication can be provided via MBMS service. The MBMS aims at providing an efficient mode of delivery for both broadcast and multicast services over a core network. In 3GPP LTE, the GCSE downlink broadcast may be implemented via the MBMS architecture which is specified in TS 23.246. In FIG. 1, an example network structure 100 for V2X message transmission reusing the GCSE architecture is illustrated, where a V2X AS acts as a GCS AS 101. In this example network structure, key network entities include an application server of GCS (denoted as GCS AS and V2X AS 101 in FIG. 1) and a Broadcast-Multicast Service Centre (BM-SC) 102. The traffic goes from the GCS AS 101 towards the BM-SC 102, and then the BM-SC may, for example, forward it to a MBMS Gateway (MBMS GW) 103 for sending to terminal devices via a radio access network (RAN) such as an E-UTRAN 104. The E-UTRAN 104 provides services to terminal devices via a base station in the form of an eNB (not shown in FIG. 1).

Figure 2:
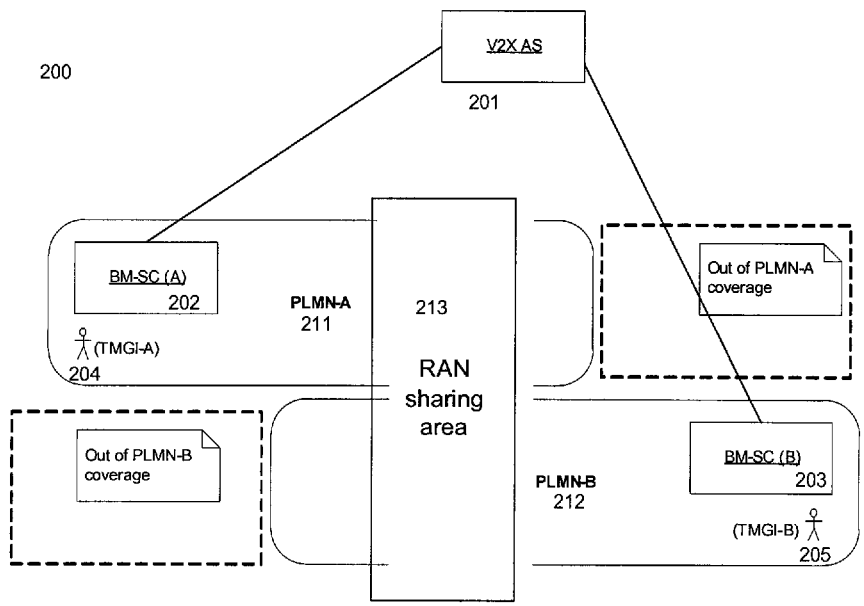
FIG. 2 illustrates an example of a V2X scenario with RAN sharing.

The MBMS service may be provided in a network sharing scenario. Network sharing is a way for operators to share heavy deployment costs for mobile networks, and a network sharing architecture shall allow different core network operators to connect to a shared radio access network (RAN). More details of the network sharing may be found, for example, in 3GPP TS 23.251. FIG. 2 schematically shows a V2X scenario 200 with RAN sharing. It can be observed from the FIG. 2 that a same V2X AS 201 is connected to both PLMN A 211 and PLMN B 212 via two separate MB2 interface with BM-SC 202 and BM-SC 203 respectively. The area 213 in the middle of FIG. 2 is operated with a shared RAN configuration. UE 204 attached to PLMN-A 211 and UE 205 attached to PLMN-B 212 receive corresponding PLMN's specific bearer respectively. The bearers of PLMN A and PLMN B are identified by TMGI-A and TMGI-B respectively in this example. This TMGI is not changed as UE moves across the corresponding PLMN to the other side.

In current MBMS architecture with network sharing, each serving PLMN carries its own MBMS infrastructure and broadcasts its contents without consideration of other PLMNs. Each PLMN's BM-SC will also assign their PLMN's specific Temporary Mobile Group Identity (TMGI) for the MBMS bearer service offered to GCS AS during a MB2 procedure specified in TS 23.468 [v13.3.0]. Consequently, the MBMS data for each TMGI is transmitted over the air interface with different logical channel identities (LCIDs) independent of the MBMS data for other TMGIs. This is acceptable when Mobile network operator (MNO) may restrict access to V2X services only to UEs with valid subscription in its PLMN.

In an area where V2X services are provided by a plurality of PLMNs, V2X service shall ensure that V2X data being broadcast in a given geo-location are identical in the plurality of PLMNs used for the MBMS bearer service, if access to V2X services is restricted to UEs of a given PLMN only. For example, in the example shown in FIG. 2, it is assumed that data is sent by the same V2X AS to both BM-SCs and the V2X message to the broadcast area is identical. This is a very likely scenario for V2X service. Inventors of the present disclosure have realized that when the plurality of PLMNs operate in a shared RAN configuration as shown in FIG. 2, if without any optimization, the BM-SC of PLMN A and the BM-SC of PLMN B will send the same data to a same eNB in the shared RAN for broadcasting data over two MBMS radio bearers (MRBs), that is, broadcasting data over a separate MRB for each PLMN. It will result in a waste of both backhaul and radio capacity. Therefore, it is not necessary for the RAN to send a plurality of copies of same data over the core network and the air interface in such case.

Inventors of the present disclosure have also realized that similar problem may arise even in a single PLMN scenario, when a V2X server requests distribution of content in a plurality of MBMS service areas, which may be served by a same eNB and at least partially overlap.

To solve at least part of the above problems, methods, apparatus and computer programs are provided in this disclosure. It should be appreciated that the proposed principle may also be applied in other scenarios than that mentioned above if similar problem exits.

Figure 3:
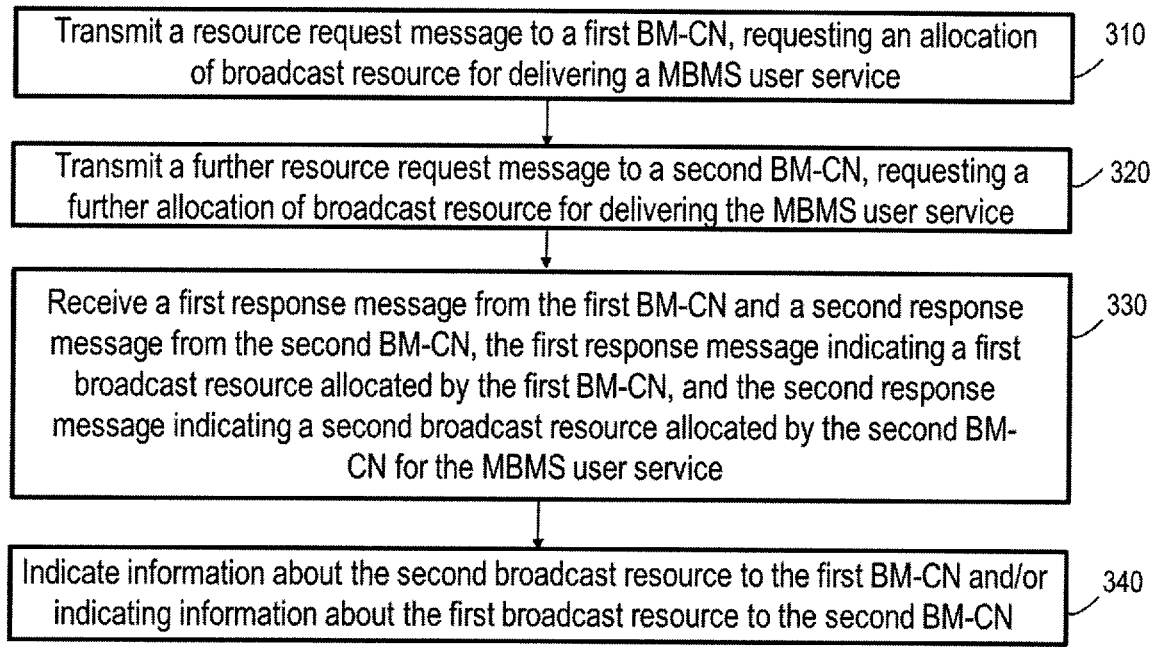
FIG. 3 illustrates a flowchart of a method at least partially implemented at an application server according to an embodiment of the present disclosure.

Reference is now made to FIG. 3, which shows a flow-chart of a method 300 according to an embodiment of the present disclosure. The method 300 is at least partially implemented at an application server (e.g., GCS AS 101 shown in FIG. 1 or the V2X AS 201 shown in FIG. 2).

As shown in FIG. 3, the method 300 comprises transmitting, at block 310, a resource request message to a first broadcast/multicast control node (BM-CN), requesting an allocation of broadcast resource for delivering a MBMS user service; transmitting, at block 320, a further resource request message to a second BM-CN, requesting a further allocation of broadcast resource for delivering the MBMS user service; receiving, at block 330, a first response message from the first BM-CN and a second response message from the second BM-CN, the first response message indicating a first broadcast resource allocated by the first BM-CN for the MBMS user service, and the second response message indicating a second broadcast resource allocated by the second BM-CN for the MBMS user service; and at block 340, indicating information about the second broadcast resource to the first BM-CN and/or indicating information about the first broadcast resource to the second BM-CN.

The information indicated at block 340 may be forwarded by the BM-CN to a RAN network node, thereby enabling the RAN network node to deliver a same MBMS user service via a single broadcast radio bearer. Therefore, with embodiments of the disclosure, resource waste may be reduced or avoided.

In one embodiment, the BM-CN may be a Broadcast Multicast Service Centre (also referred to as a BM-SC, e.g., BM-SC A 202 and BMSC B 203 shown in FIG. 2, or BM-SC 102 shown in FIG. 1). However, embodiments of the disclosure are not limited thereto. For example, in another embodiment, the BM-CN can be any suitable network node with similar functions.

In some embodiments, the first BM-CN may belong to a first PLMN and the second BM-CN may belong to a different second PLMN, as shown in the example of FIG. 2. In this example, the PLMN A and the PLMN B share a same RAN, and the first BM-CN can be BM-SC A and the second BM-CN can be the BM-SC B. In one embodiment, the AS may inform the BM-SC A (and/or BM-SC B), at block 340, about resources allocated for a MBMS user service, which may include resource allocated by both PLMN A and PLMN B. When this information is delivered to a RAN node by the BM-SC A (and/or B), the RAN node will be aware that the two allocated resources are related to a same MBMS user service, and will be able to broadcast corresponding data to terminal devices via a single radio bearer in order to save resource, power and capacity. In another embodiment, at block 340, the AS may only inform the BM-SC A (and/or BM-SC B) about resource allocated for the MBMS user service by another PLMN, that is, resource allocated by the receiving BM-SC itself may not be indicated. It should be appreciated that embodiments may also be applied to a scenario where both the first BM-CN and the second BM-CN belong to a same PLMN.

In another embodiment, the first BM-CN and the second BM-CN may be a same BM-CN. In this embodiment, the resource request message transmitted at block 310 and the further resource request message transmitted at block 320 by the application server may request resource for a same MBMS user service, but with different parameters. For example, by using the further resource request message, the application server may request the MBMS user service be provided in a larger service area than that indicated in the resource request message transmitted at block 320.

In another embodiment, the first BM-CN may serve a first MBMS service area, and the second BM-CN may serve a different second MBMS service area which at least partially overlaps with the first MBMS service area. In this embodiment, same MBMS service may need to be provided in the overlapped MBMS service area. Using the method 300, the AS may indicate to the first BM-CN (and/or the second BM-CN) resource allocation for the MBMS user service (which includes resource allocated by both BM-CNs or by another BM-CN only) at block 340, and the first BM-CN (and/or the second BM-CN) in turn can inform the resource allocated by both BM-CNs for the same MBMS user service to a RAN node serving the overlapped MBMS service area. Thereby the RAN node is enabled to deliver the MBMS user service in the overlapped area with a single radio bearer.

As one example, the resource allocated for the MBMS user service may be identified by a temporary mobile group identity (TMGI). In this example, at block 330, the AS may receive a first TMGI (e.g., denoted as TMGI #1 for simplicity) from the first BM-CN and a second TMGI (e.g., denoted as TMGI #1) from the second BM-CN; and at block 340, the AS may indicate TMGI #2 (or both TMGI #1 and TMGI #2) to the first BM-CN, and/or, indicate TMGI #1 (or both TMGI #1 and TMGI #2) to the second BM-CN.

It should be appreciated that embodiments of the present disclosure are not limited to any specific signaling for conveying the information indicated at block 340. Just for illustration rather than limitation, at block 340, the AS may indicate the information to one or more of the BM-CNs by: including the information about the second broadcast resource (or both the first broadcast resource and the second broadcast resource) into a first Activate MBMS Bearer Request message as a new information element (IE), and transmitting the first Activate MBMS Bearer Request message to the first BM-CN; and/or including the information about the first broadcast resource (or both the first broadcast resource and the second broadcast resource) into a second Activate MBMS Bearer Request message as a new IE, and transmitting the second Activate MBMS Bearer Request message to the second BM-CN. Alternatively, in another embodiment, at block 340, the information about the second/first broadcast resource may be included into an existing IE of an existing message, and then the existing message may be transmitted. A receiver of the existing message may know about the new meaning of the existing IE in advance based on signaling or predefinition.

Though embodiments are described with reference to two BM-CNs, it should be appreciated that the method 300 may be applied to a scenario involving more than two BM-CNs.

Figure 4:
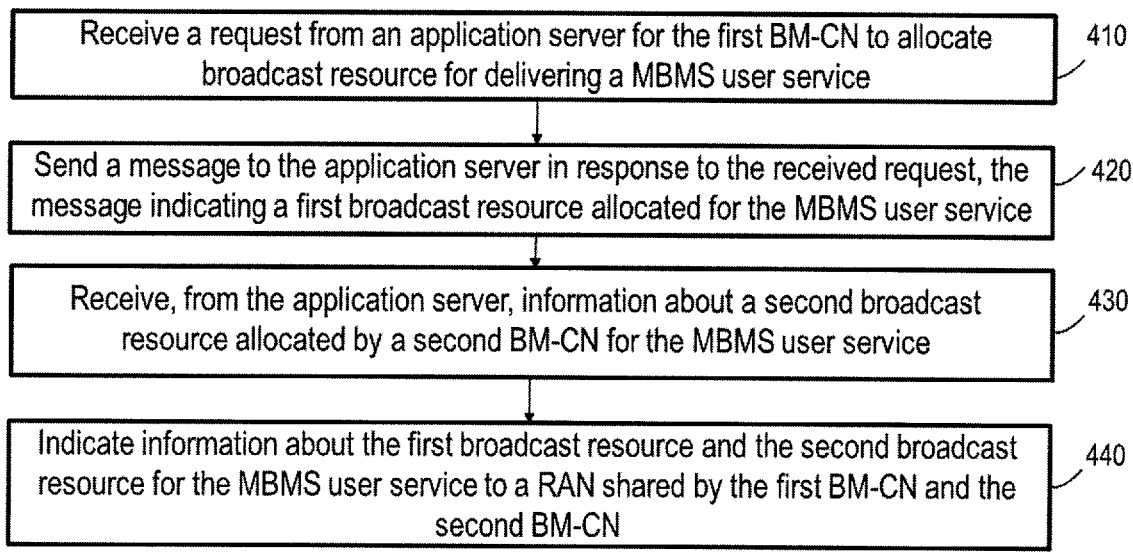
FIG. 4 illustrate flowcharts of a method at least partially implemented at a broadcast/multicast control node (BM-CN) according to an embodiment of the present disclosure.

Reference is now made to FIG. 4, which shows a flowchart of a method 400 according to an embodiment of the present disclosure. The method 400 is at least partially implemented at a BM-CN (e.g., BM-SC 102 of FIG. 1, or BM-SC 202/203 of FIG. 2), which is denoted as BM-CN #1 hereafter.

As shown in FIG. 4, the method 400 comprises receiving, at block 410, a request from an application server for the BM-CN #1 to allocate broadcast resource for delivering a MBMS user service; sending, at block 420, a message to the application server in response to the received request, the message indicating a first broadcast resource allocated by the BM-CN #1 for the MBMS user service; receiving, at block 430, from the application server, information about a second broadcast resource allocated by a BM-CN #2 for the MBMS user service; and at block 440, indicating information about the first broadcast resource and the second broadcast resource for the MBMS user service to a RAN shared by the first BM-CN and the second BM-CN.

The BM-CN #1 and the BM-CN #2 may be the first BM-CN and the second BM-CN involved in method 300, and therefore, descriptions provided with reference to method 300 on the first BM-CN and the second BM-CN also apply here. For example, the BM-CN #1 may be a BM-SC, shown in FIG. 1 or FIG. 2.

In one embodiment, the BM-CN #1 and the BM-CN #2 may belong to different PLMNs, as shown in an example scenario of FIG. 2. However, it should be appreciated that application of the method 400 to a scenario where both BM-CN #1 and BM-CN #2 belong to a same PLMN is not excluded. In another embodiment, BM-CN #1 and BM-CN #2 (e.g., a first BM-SC and a second BM-SC) may serve different MBMS service areas which at least partially overlap. In still another embodiment, the first BM-CN and the second BM-CN may be a same BM-CN, as described with reference to method 300.

In some embodiments, at block 420, the broadcast resource may be indicated as a TMGI (e.g., TMGI #1) in the message. It can be appreciated that in other embodiments, the broadcast resource may be identified/indicated via another identifier.

In one embodiment, at block 430, the BM-CN #1 may receive both a first TMGI (e.g., TMGI #1) for identifying the first broadcast resource and a second TMGI (e.g., TMGI #2) for identifying the second broadcast resource from the application server. In another embodiment, the BM-SC #1 may receive only the second TMGI (e.g., TMGI #2) from the application server, since it is aware of the TMGI #1 already which is allocated by itself.

Embodiments are not limited to any specific message for conveying the information received at block 430 and information sent out at block 440. Just as one example, in an embodiment, the BM-CN #1 may receive the information about the second broadcast resource, at block 430, via a new IE in a first Activate MBMS Bearer Request message from the application server. That is, a conventional Activate MBMS Bearer Request message may be modified to include the new IE. Alternatively, in another embodiment, at block 430, the information about the second/first broadcast resource may be received in an existing IE of an existing message. That is, an existing IE of an existing message may be reused for indicating the information about the first/second broadcast resource. The BM-CN #1 may know new meaning of the existing message based on signaling or predefinition.

In another embodiment, at block 440, the BM-CN #1 may indicate information about both the first broadcast resource and the second broadcast resource for the MBMS user service to the RAN via a MBMS Session Start Request message. In still another embodiment, the BM-CN #1 may indicate the information at block 440 via a MBMS Session Update Request message, alternatively. The indicated information may be received by, for example, a base station or a multi-cell/multicast coordination entity (MCE) of the RAN. In a further embodiment, the BM-CN #1 may also indicate the information of both the first broadcast resource and the second broadcast resource to a terminal device of the RAN. For example, a BM-SC may send this information to the terminal device via a MBMS service announcement message. That is, a conventional MBMS service announcement message may be modified to include a new IE for indicating this information. In another embodiment, the conventional MBMS service announcement message may be modified to reuse an existing IE for indicating this information. New meaning of the existing IE may be known by a receiver based on signaling or predefinition.

Figure 5:
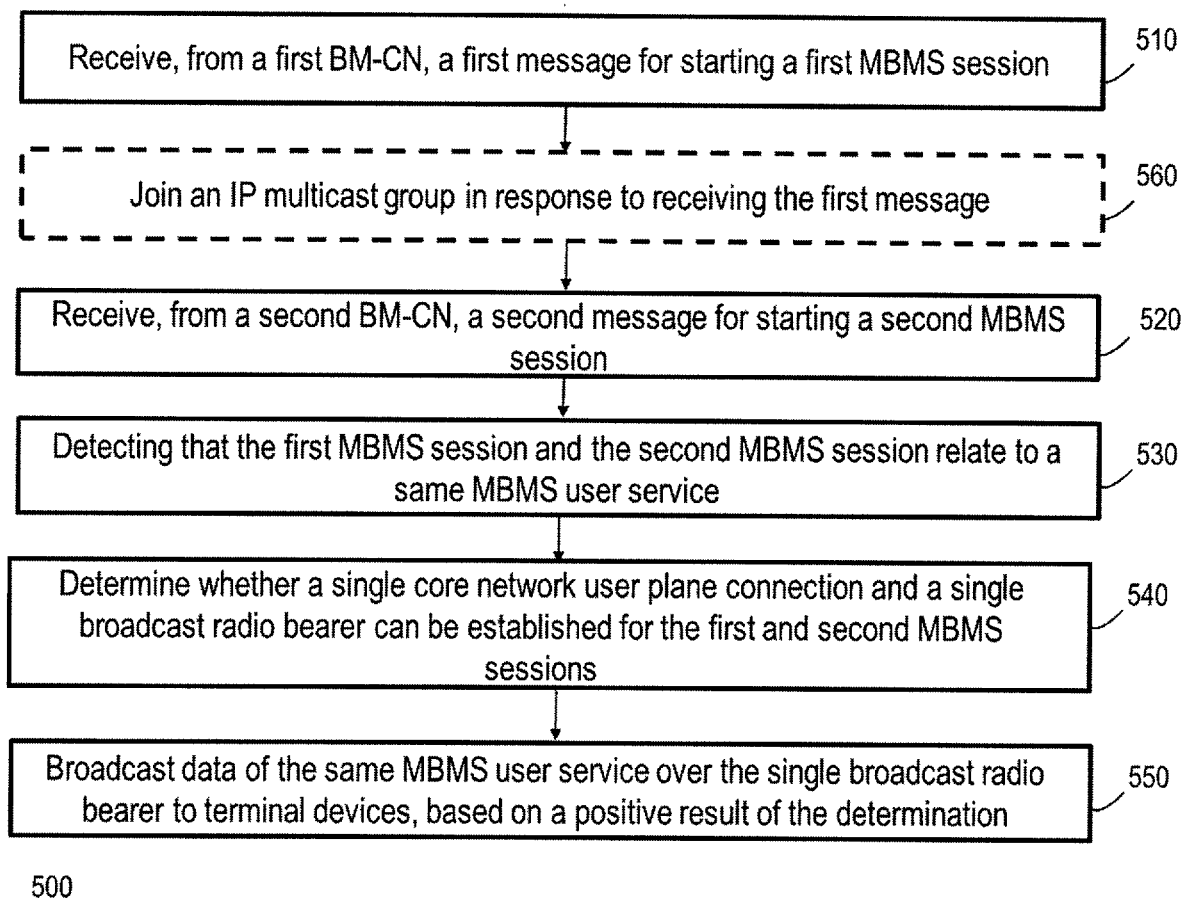
FIG. 5 illustrate flowcharts of a method at least partially implemented at a RAN network node according to an embodiment of the present disclosure.

Reference is now made to FIG. 5, which shows a flowchart of a method 500 according to an embodiment of the present disclosure. The method 500 is at least partially implemented at a network node of a RAN (e.g., a base station in the E-UTRAN 104 shown in FIG. 1 or a base station in the shared RAN 213 shown in FIG. 2). In one embodiment, the network node may have functions of both a MCE and a base station (e.g., an eNB), As shown in FIG. 5, the method 500 comprises receiving from a first broadcast/multicast control node (BM-CN), at block 510, a first message for starting or updating a first MBMS session; receiving from a second BM-CN, at block 520, a second message for starting or updating a second MBMS session; detecting, at block 530, that the first MBMS session and the second MBMS session relate to a same MBMS user service; at block 540, determining whether a single broadcast radio bearer can be established for the first and second MBMS sessions; and at block 550, broadcasting data of the same MBMS user service over the single broadcast radio bearer to terminal devices, based on a positive result of the determination.

In some embodiment, the first BM-CN and the second BM-CN may be a same BM-CN. In another embodiment, each of the first BM-CN and the second BM-CN may be a BM-SC. However, it should be appreciated that embodiments of the disclosure are not limited to such a specific scenario.

In one embodiment, the first BM-CN and the second BM-CN may belong to different PLMNs, as shown in an example scenario of FIG. 2. In another embodiment, the first BM-CN and the second BM-CN may serve different MBMS service areas which at least partially overlap.

In some embodiments, the first message received at block 510 and the second message received at block 520 may be that sent by the first BM-CN and the second BM-CN at block 440 according to method 400, and therefore, descriptions provided with reference to method 400 with respect to block 440 also apply here and details will not be repeated. For example, the first message or the second message may be a MBMS Session Start Request message or a MBMS Session Update Request message. However, embodiments are not limited to any specific message format.

In one embodiment, said detecting at block 530 is based on an indication included in first message and/or the second message, the indication indicating a broadcast resource allocated by the first BM-CN/the second BM-CN, and a further related broadcast resource allocated by the second BM-CN/the first BM-CN for the same MBMS user service. The indication included in the first message and/or the second message indicates a relationship between the broadcast resource and the further related broadcast resource, i.e., they both are associated with a same MBMS user service. This indication enables the network node to deliver the MBMS user service via a single broadcast radio bearer.

In one embodiment, each of the broadcast resources may be identified by a TMGI.

In a LTE network, a concept of MBMS Service Area (MBMS SA) is defined, and according to the 3GPP TS 23.246, it is an area within which data of a specific MBMS session are sent. Each individual MBMS session of an MBMS Bearer Service may be sent to a different MBMS Service Area. This MBMS Service Area is the same or a subset of the Multicast or Broadcast Service Area as defined in 3GPP TS 22.146. An MBMS Service Area smaller than the Multicast or Broadcast Service Area is typically used for localized services. It is also defined in 3GPP TS 23.003 that a MBMS SA comprises a list of MBMS Service Area Identities (MBMS SAIs). The detailed structure of the MBMS SAI can be found in section 15.3 of TS23.003. An MBMS SAI shall identify a group of cells within a PLMN, that is independent of the associated Location/Routing/Service Area and the physical location of the cell(s). A cell shall be able to belong to one or more MBMS SAs, and therefore is addressable by one or more MBMS SAIs. The MBMS SAI shall be a decimal number between 0 and 65,535 (inclusive). The value 0 has a special meaning; it shall denote the whole PLMN as the MBMS Service Area and it shall indicate to a receiving RNC/BSS/MCE that all cells reachable by that RNC/BSS/MCE shall be part of the MBMS Service Area. With the exception of the specific MBMS Service Area Identity with value 0, the MBMS Service Area Identity shall be unique within a PLMN and shall be defined in such a way that all the corresponding cells are MBMS capable.

In one embodiment, a MCE of the network node may receive configuration information from an eNB, e.g. during a M2 connection setup. The configuration information includes for each cell a list of MBMS SAIs. The list can include up to 256 entries. Please refer to TS 36.443 for more details.

In another embodiment, the first message and the second message received at block 510 and 520 may include a MBMS Service Area IE, which further includes a list of MBMS SAIs.

The network node may obtain related TMGIs based on the first message and/or the second message in one embodiment, and then it can perform the determination at block 540 accordingly. For example, if there are two MBMS sessions identified by TMGI #1 and TMGI #2 respectively, then the network node (e.g., a MCE function therein) can use list #1 of MBMS SAIs of a MBMS session identified by TMGI #1 and list #2 of MBMS SAIs of a MBMS session identified by TMGI #2 for the determination. By using the method 500, at block 540, based on MBMS SAIs in both lists, the network node may determine that only one MBMS session is started in that area, i.e. only one MBMS radio bearer are needed. In another embodiment, additionally, the network node may also determine at block 540 that a single core network user plane connection can be established for the network node to receive data for both MBMS sessions from the core network.

Alternatively or additionally, in another embodiment, at block 540, the network node may make the determination based on lists of cell IDs (e.g., ECGIs) included in the first and the second message.

In some embodiments, data for the MBMS user service broadcasted by the network node at block 550 may be that obtained by the network node over a single core network user plane connection from the core network.

In some embodiments, at block 550, the network node of the RAN may broadcast the data of the same MBMS user service using a single logical channel identity (MAC identity of a logical channel, also referred to as LCID hereafter) configured for either the first MBMS session or the second MBMS session. For example, this embodiment may be applied to a scenario where a Multicast Broadcast Single Frequency Network (MBSFN) technique is used for providing MBMS service. In this case, an association between the LCID and a TMGI may be signaled to terminal devices, for example, via a RRC signaling.

In another embodiment, the single broadcast radio bearer used by the network node for broadcasting at block 550 may be represented by a Radio Network Temporary Identifier (RNTI). For example, this embodiment may be applied to a scenario where LTE Single-Cell Point To Multipoint (SC-PTM) transmission is used for providing the MBMS service.

Optionally, in one embodiment, the method 500 may comprise a block 560, where the network node joins an Internet Protocol (IP) multicast group in response to the first message received at block 510. In another embodiment, when the network node receives the second message later than the first message, and found that they are associated with the same MBMS user service, then the network node may not join an IP multicast group in response to the second message if it has joined an IP multicast group at block 560. In still another embodiments, alternatively, the network node may join the IP multicast group in response to the second message.

In some embodiments, the network node may be a combination of a MCE function and a base station, and in these embodiments, operations in some block may be performed by the MCE, and other blocks by the base station. However, embodiments are not limited to any specific arrangement of the network node. For example, the network node may be a base station which performs all the operations, or, the network node may have several distributed components to perform operations of the blocks.

Figure 6:
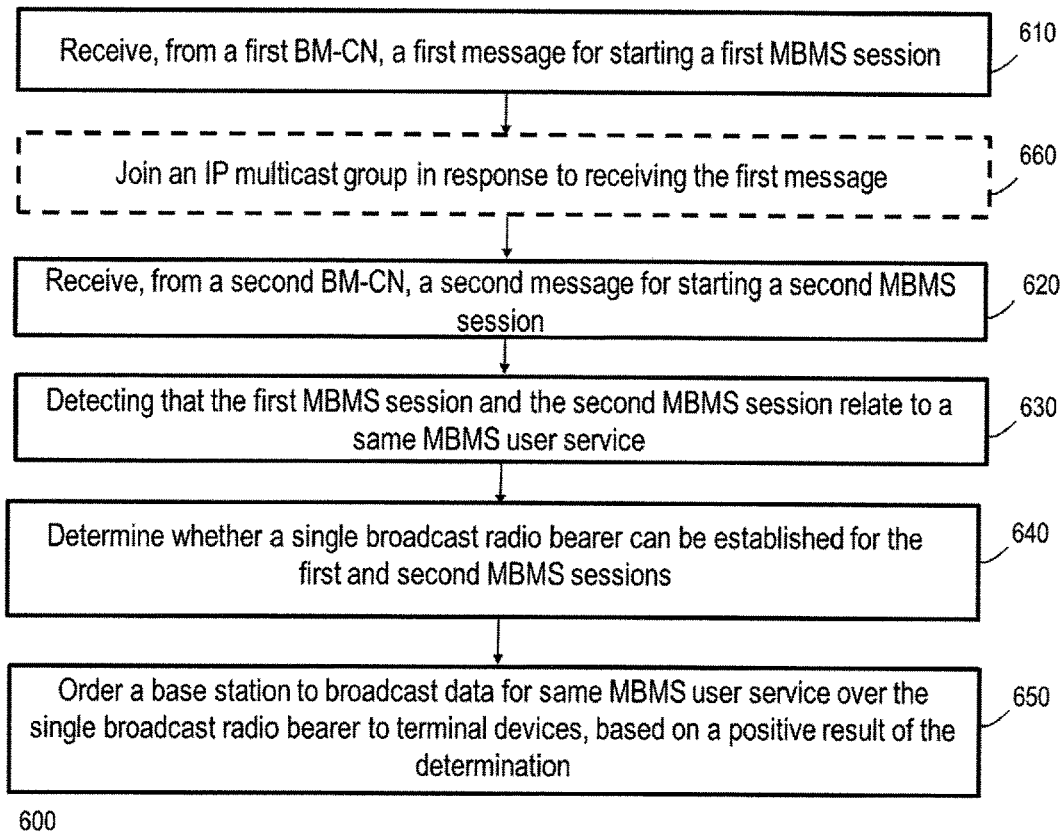
FIG. 6 illustrate flowcharts of a method at least partially implemented at another RAN network node according to an embodiment of the present disclosure.

Reference is now made to FIG. 6, which shows a flowchart of a method 600 according to an embodiment of the present disclosure. The method 600 is at least partially implemented at a network node of a RAN (e.g., a MCE in the E-UTRAN 104 shown in FIG. 1). To simplify the description, the network node is denoted as a second network node hereafter. In one embodiment, the second network node may be embedded in the network node described with reference to method 500 as a part, while in another embodiment, the second network node may locate separately from the network node of method 500.

As shown in FIG. 6, the method 600 comprises receiving from a first BM-CN, at block 610, a message for starting a first MBMS session; receiving from a second BM-CN, at block 620, a further message for starting a second MBMS session; detecting that the first MBMS session and the second MBMS session relate to a same MBMS user service at block 630; determining, at block 640, whether a single core network user plane connection and a single broadcast radio bearer can be established for the first and second MBMS sessions; and at block 650, ordering a base station to establish the single core network user plane connection and broadcast data from the single core network user plane connection over the single broadcast radio bearer to terminal devices, based on a positive result of the determination.

In one embodiment, the first BM-CN and the second BM-CN may belong to different PLMNs, as shown in an example scenario of FIG. 2. In another embodiment, the first BM-CN and the second BM-CN may serve different MBMS service areas which at least partially overlap. In still another embodiment, the first BM-CN and the second BM-CN may be a same BM-CN.

In some embodiments, operations of the blocks 610-640 may be same as that described with reference to blocks 510-540 of method 500, and therefore details will be omitted. The difference from method 500 is that, at block 650, the second network node orders a base station to broadcast MBMS data using a single broadcast radio bearer rather than broadcasting the MBMS data itself. In another embodiment, at block 650, the second network node may additionally order the base station to establish only a single core network user plane connection to receive data for the MBMS user service from the core network.

In another embodiment, the method 600 may further comprise a block 660, where similar operation as that described with reference to block 560 of method 500 can be performed.

In some embodiments, as described with reference to method 500, the single broadcast radio bearer may be represented as a single LCID or a single RNTI, however, embodiments of the disclosure are not limited thereto.

After receiving the order transmitted by the second network node at block 650, the base station may perform similarly as that specified currently, for example, in a LTE standard. That it, the base station may regard the order as a trigger for starting a MBMS session, and it is enabled to deliver corresponding data using the single broadcast radio bearer.

Figure 7:
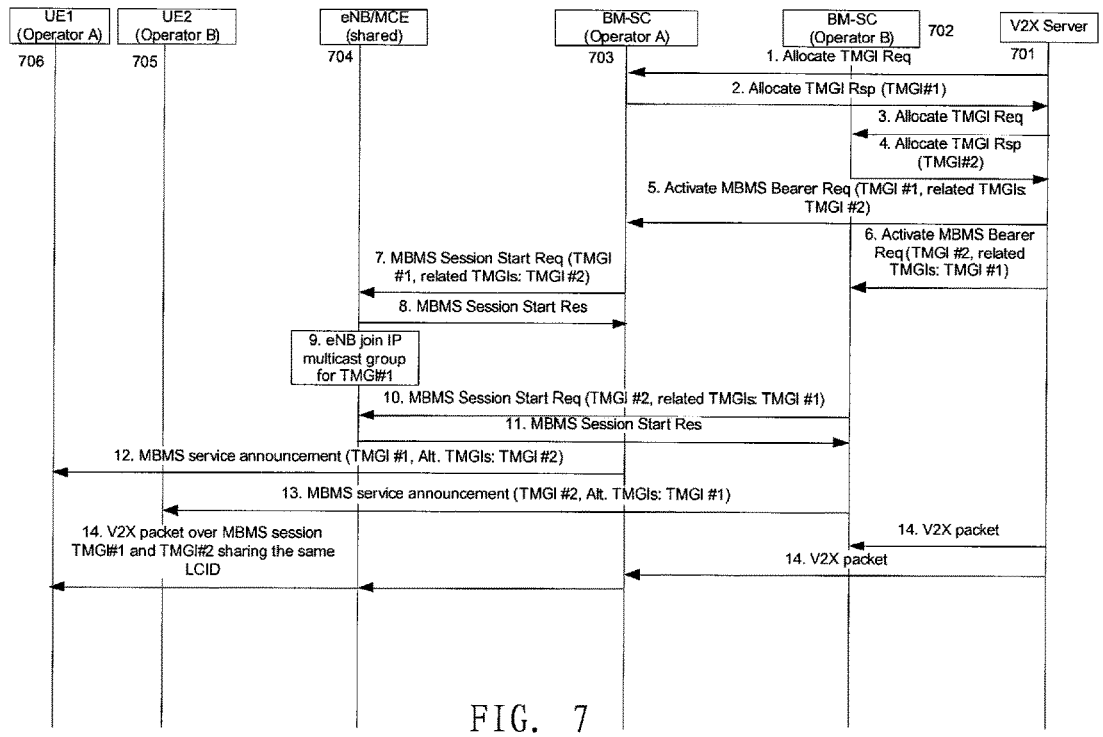
FIG. 7 illustrates a schematic diagram of signaling flow among an AS, BM-SCs, eNB/MCE and UEs for delivering MBMS user service according to an embodiment of the present disclosure.

In FIG. 7, an example of signaling exchange among an AS, BM-SCs, eNB/MCE and UEs for delivering MBMS user service in an efficient way according to an embodiment of the present disclosure is illustrated. As shown in FIG. 1, the AS 701 may be a V2X sever, and it requests resource allocation for a MBMS user service from both the BM-SC 702 and BM-SC 703 via separate Allocate TMGI Request messages (shown as signaling 1 and 3 in FIG. 7), and in response the V2X server gets Allocate TMGI Response messages from the BM-SCs 702 and 703 (shown as signaling 2 and 4 in FIG. 7), the messages including a TMGI #1 and a TMGI #2 respectively. In this example, the V2X server informs to both BM-SC 702 and BM-SC 703 that the TMGI #1 and the TMGI #2 are related to same MBMS user service, via two separate Activate MBMS Bearer Request message (5 and 6 shown in FIG. 7). As shown in FIG. 7, the message may include a TMGI #1 and a related TMGI-TMGI #2, or include a TMGI #2 and a related TMGI-TMGI #1, wherein the "related TMGIs" is a new IE which can indicate one or more TMGIs associated with same MBMS user service. In another embodiment, the information of "related TMGIs" may be included into an existing IE. It should be appreciated that in another example, the V2X server may inform such information to only one of the two BM-SCs. As shown in FIG. 7, the BM-SC may forward such information (an association of TMGI #1 and TMGI #2 with same MBMS user service) to an eNB or a MCE 704, e.g., using a MBMS Session Start Request message (shown as signaling 7 and 10) via MBMS-GW and MME (Note: the MBMS-GW and MME are not shown in the figure for simplicity reason). In this example, the eNB/MCE responses with a MBMS Session Start Response message (signaling 8 or 11 in FIG. 7), however, this is not necessary and may be omitted in another example embodiment. Optionally, the BM-SC may also inform the information to terminal devices, e.g., UEs 705 and 706. After getting the information showing that both TMGI #1 and TMGI #2 associate with a same MBMS user service, the eNB 704 is able to obtain corresponding data from the core network over a single core network user plane connection, and broadcast the received data to UEs via a single radio bearer (e.g., a single LCID).

Figure 8:
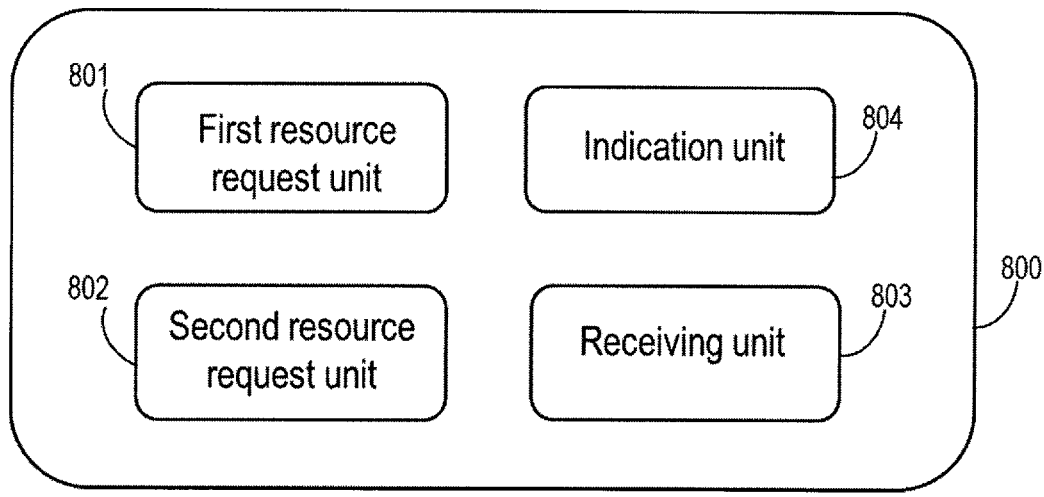
FIG. 8 illustrates a simplified block diagram of an apparatus in an application server according to an embodiment of the present disclosure.

Reference is now made to FIG. 8, which illustrates a schematic block diagram of an apparatus 800 in an application server. The server may be, for example, the GCS AS 101 shown in FIG. 1, or a V2X AS shown in FIG. 2. The apparatus 800 is operable to carry out the example method 300 described with reference to FIG. 3 and possibly any other processes or methods. It is also to be understood that the method 300 is not necessarily carried out by the apparatus 800. At least some steps of the method 300 can be performed by one or more other entities.

As illustrated in FIG. 8, the apparatus 800 comprises a first resource request unit 801, a second resource request unit 802, a receiving unit 803 and an indication unit 804. The first resource request unit 801 is configured to transmit a resource request message to a first broadcast/multicast control node (BM-CN), requesting an allocation of broadcast resource for delivering a multimedia broadcast/multicast service (MBMS) user service. The second resource request unit 802 is configured to transmit a further resource request message to a second BM-CN, requesting a further allocation of broadcast resource for delivering the MBMS user service. The receiving unit 803 is configured to receive a first response message from the first BM-CN and a second response message from the second BM-CN, the first response message indicating a first broadcast resource allocated by the first BM-CN for the MBMS user service, and the second response message indicating a second broadcast resource allocated by the second BM-CN for the MBMS user service. The indication unit 804 is configured to indicate information about the second broadcast resource to the first BM-CN and/or indicating information about the first broadcast resource to the second BM-CN.

In some embodiment, the units 801-804 may be configured to perform the operations of blocks 310-340 of method 300 respectively, and therefore relevant descriptions provided with reference to method 300 and FIG. 3 also apply here, and details will not be repeated.

In one embodiment, the indication unit 804 may be configured to indicate a first TMGI for identifying the first broadcast resource and a second TMGI for identifying the second broadcast resource to the first BM-CN and/or the second BM-CN.

In another embodiment, the indication unit may comprise a first message transmitting unit, configured to include the information about the second broadcast resource into a first Activate MBMS Bearer Request message as a new information element (IE), and transmit the first Activate MBMS Bearer Request message to the first BM-CN; and/or a second message transmitting unit, configured to include the information about the first broadcast resource into a second Activate MBMS Bearer Request message as a new IE, and transmit the second Activate MBMS Bearer Request message to the second BM-CN. In another embodiment, alternatively, the information about the first/second broadcast resource may be indicated by using an existing IE of an existing message. That is, the existing IE of the existing message (e.g., the Activate MBMS Bearer Request message) may be provided with a new meaning, and the new meaning may be known by a receiver of the message in advance, for example based on signaling or predefinition.

Figure 9:
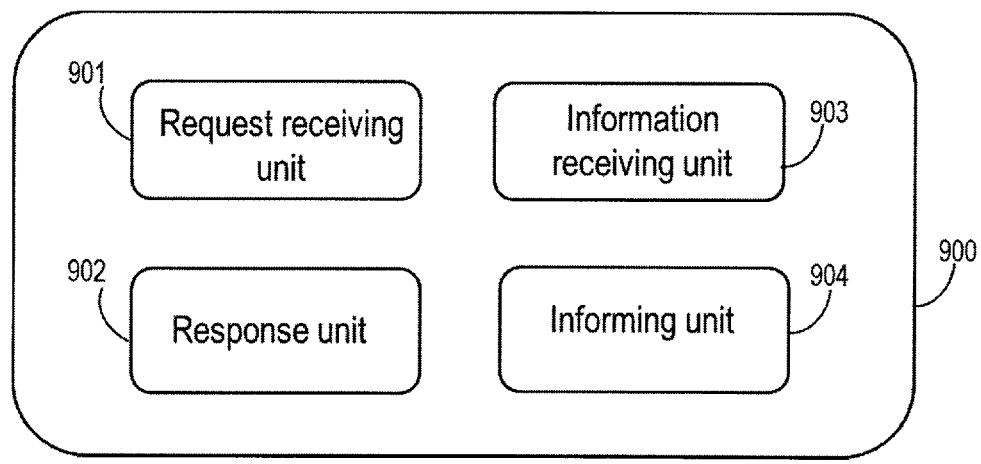
FIG. 9 illustrates a simplified block diagram of an apparatus in a BM-CN according to an embodiment of the present disclosure.

FIG. 9 illustrates a schematic block diagram of an apparatus 900 at least partially implemented at a first BM-CN. The BMCN may be a BM-SC 102 shown in FIG. 1 or the BM-SC A or BM-SC B shown in FIG. 2. The apparatus 900 is operable to carry out the example method 400 described with reference to FIG. 4 and possibly any other processes or methods. It is also to be understood that the method 400 is not necessarily carried out by the apparatus 900. At least some steps of the method 400 can be performed by one or more other entities.

As illustrated in FIG. 9, the apparatus 900 comprises a request receiving unit 901, configured to receive a request from an application server for the first BM-CN to allocate broadcast resource for delivering a multimedia broadcast/multicast service (MBMS) user service; a response unit 902, configured to send a message to the application server in response to the received request, the message indicating a first broadcast resource allocated by the first BM-CN for the MBMS user service; an information receiving unit 903, configured to receive, from the application server, information about a second broadcast resource allocated by a second BM-CN for the MBMS user service; and an informing unit 904, configured to indicate information about the first broadcast resource and the second broadcast resource for the MBMS user service to a radio access network (RAN) shared by the first BM-CN and the second BM-CN.

In some embodiment, the units 901-904 may be configured to perform the operations of blocks 410-440 of method 400 respectively, and therefore relevant descriptions provided with reference to method 400 and FIG. 4 also apply here, and details will not be repeated. For example the first BM-CN and the second BM-CN may be a same BM-CN in one embodiment. In another embodiment, the first BM-CN and the second BM-CN may belong to different PLMNs, or serve different but overlapped MBMS service areas.

In one embodiment, the information receiving unit 903 may be configured to receive a first TMGI for identifying the first broadcast resource and a second TMGI for identifying the second broadcast resource from the application server. In another embodiment, the information receiving unit may be configured to receive the information about a second broadcast resource via a new IE in a first Activate MBMS Bearer Request message from the application server. In another embodiment, the information receiving unit may be configured to receive the information about a second broadcast resource via an existing IE of an existing message. New meaning of the existing IE may be known by the information receiving unit, for example based on signaling or predefinition In some embodiments, the informing unit may be configured to indicate the information about the first broadcast resource and the second broadcast resource for the MBMS user service to a base station or a MCE of the RAN, via a MBMS Session Start Request or MBMS Session Update Request message. In another embodiment, the informing unit may be further configured to indicate the information about the first broadcast resource and the second broadcast resource for the MBMS user service to a terminal device of the RAN.

Figure 10:
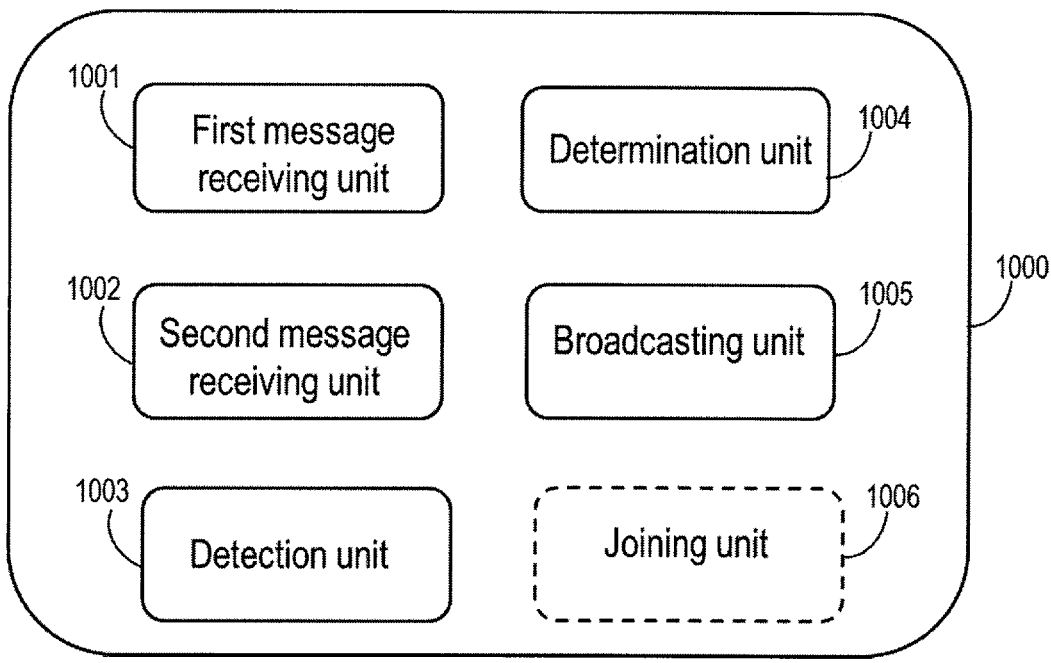
FIG. 10 illustrates a simplified block diagram of an apparatus in a RAN network node according to an embodiment of the present disclosure.

FIG. 10 illustrates a schematic block diagram of an apparatus 1000 at least partially implemented at a RAN network node, and hereafter denoted as a first network node. The first network node may be a base station or a combination of a MCE and a base station in the E-UTRAN shown in FIG. 1 or in the shared RAN area shown in FIG. 2. The apparatus 1000 is operable to carry out the example method 500 described with reference to FIG. 5 and possibly any other processes or methods. It is also to be understood that the method 500 is not necessarily carried out by the apparatus 1000. At least some steps of the method 500 can be performed by one or more other entities.

As illustrated in FIG. 10, the apparatus 1000 comprises a first message receiving unit 1001, configured to, from a first broadcast/multicast control node (BM-CN), a first message for starting a first multimedia broadcast/multicast service (MBMS) session; a second message receiving unit 1002, configured to receive, from a second BM-CN, a second message for starting a second MBMS session; a detection unit 1003, configured to detect that the first MBMS session and the second MBMS session relate to a same MBMS user service; a determination unit 1004, configured to determine whether a single core network user plane connection and a single broadcast radio bearer can be established for the first and second MBMS sessions; and a broadcasting unit 1005, configured to broadcast data of the same MBMS user service over the single broadcast radio bearer to terminal devices, based on a positive result of the determination.

In some embodiment, the units 1001-1004 may be configured to perform the operations of blocks 510-550 of method 500 respectively, and therefore relevant descriptions provided with reference to method 500 and FIG. 5 also apply here, and details will not be repeated. For example the first BM-CN and the second BM-CN may be a same BM-CN in one embodiment. In another embodiment, the first BM-CN and the second BM-CN may belong to different PLMNs, or serve different but overlapped MBMS service areas.

In one embodiment, the detection unit 1003 may be configured to detect based on an indication included in at least one of the first message and the second message, the indication indicating a broadcast resource allocated by one of the first BM-CN and the second BM-CN, and a further related broadcast resource allocated by the other of the first BM-CN and the second BM-CN for the same MBMS user service.

In another embodiment, the apparatus 100 may further comprise a joining unit 1006, configured to join an IP multicast group in response to receiving the first message. In some embodiment, the joining unit may be configured to perform of the operations described with reference to block 560 of method 500.

Figure 11:
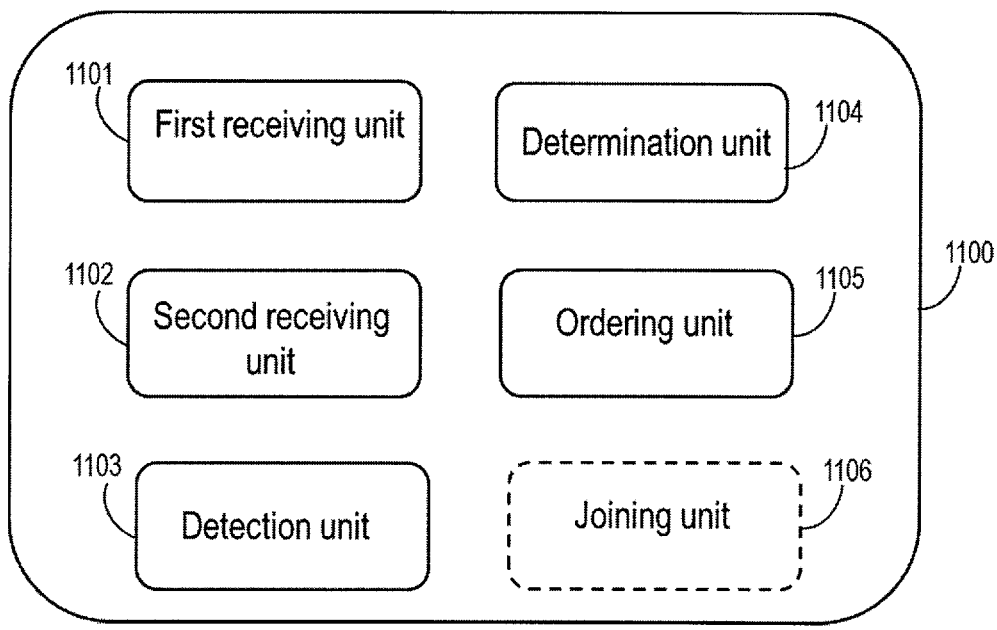
FIG. 11 illustrates a simplified block diagram of an apparatus in another Rnetwork node according to an embodiment of the present disclosure.

FIG. 11 illustrates a schematic block diagram of an apparatus 1100 at least partially implemented at another RAN network node, and hereafter denoted as a second network node. The second network node may be a separate MCE or a part of the first network node. The apparatus 1100 is operable to carry out the example method 600 described with reference to FIG. 6 and possibly any other processes or methods. It is also to be understood that the method 600 is not necessarily carried out by the apparatus 1100. At least some steps of the method 600 can be performed by one or more other entities.

As illustrated in FIG. 11, the apparatus 1000 comprises a first receiving unit 1101, configured to receive, from a first broadcast/multicast control node (BM-CN), a message for starting a first multimedia broadcast/multicast service (MBMS) session; a second receiving unit 1102, configured to receive, from a second BM-CN, a further message for starting a second MBMS session; a detection unit 1103, configured to detect that the first MBMS session and the second MBMS session relate to a same MBMS user service; a determining unit 1104, configured to whether a single core network user plane connection and a single broadcast radio bearer can be established for the first and second MBMS sessions; and an ordering unit 1105, configured to order a base station to establish the single core network user plane connection and broadcast data from the single core network user plane connection over the single broadcast radio bearer to terminal devices, based on a positive result of the determination.

In some embodiment, the units 1101-1105 may be configured to perform the operations of blocks 610-650 of method 600 respectively, and therefore relevant descriptions provided with reference to method 600 and FIG. 6 also apply here, and details will not be repeated. In one embodiment, the units 1101-1104 of the apparatus 1100 may be same as the units 1001-1004 of the apparatus 1000.

In another embodiment, the apparatus 1100 may further comprise a joining unit 1106, configured to join an IP multicast group in response to the first message received by the first receiving unit. In some embodiment, the joining unit may be configured to perform of the operations described with reference to block 560 of method 500, or block 660 of method 600.

It would be appreciated that apparatuses 800-1100 may comprise other units not shown in FIGS. 8-11. In addition, some units or modules in the apparatus 800-1100 can be combined in some implementations. For example, in one embodiment, it is possible to use a single receiving unit to receive the message to be received by the first message receiving unit 1001 and the second message receiving unit 1002 of the apparatus 1000.

Figure 12A:
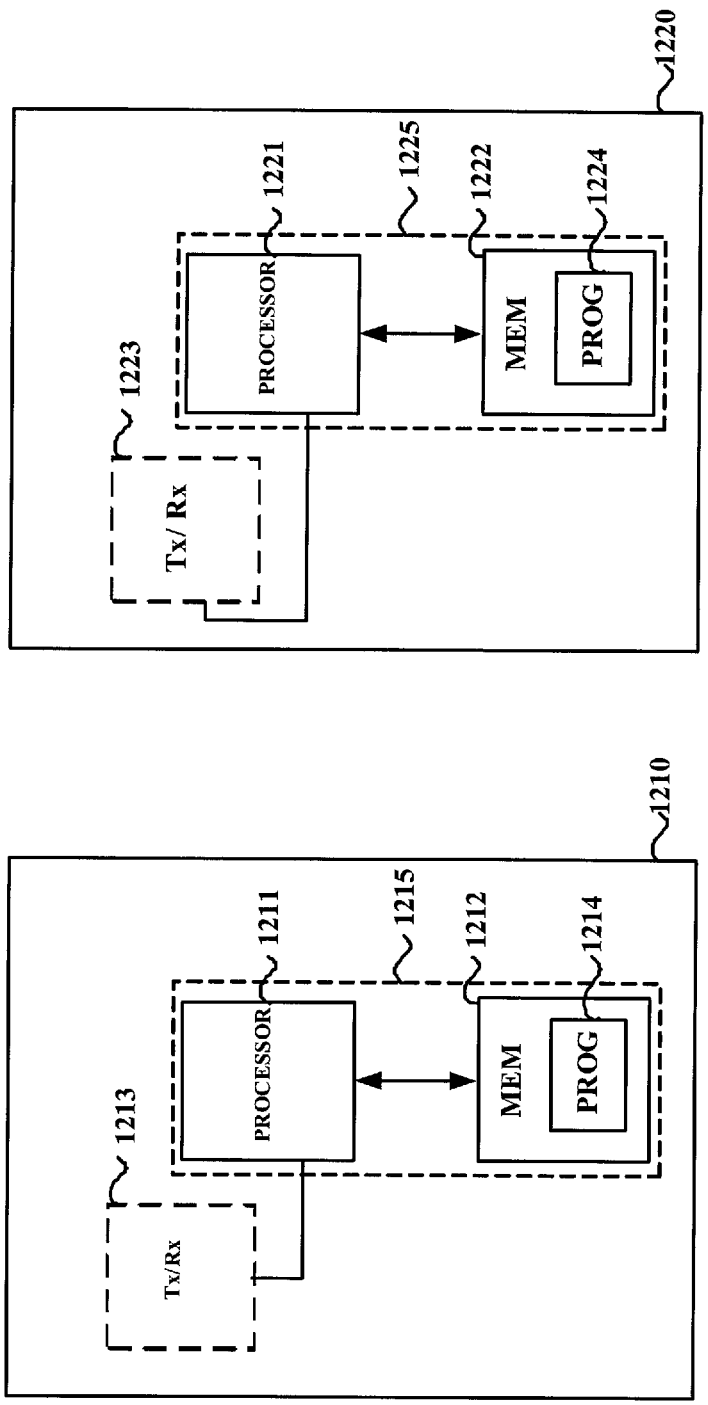
FIGS. 12a-12b illustrate simplified block diagrams of an apparatus in an application server, a BM-CN and a RAN network node, respectively, according to an embodiment of the present disclosure.
Figure 12B:
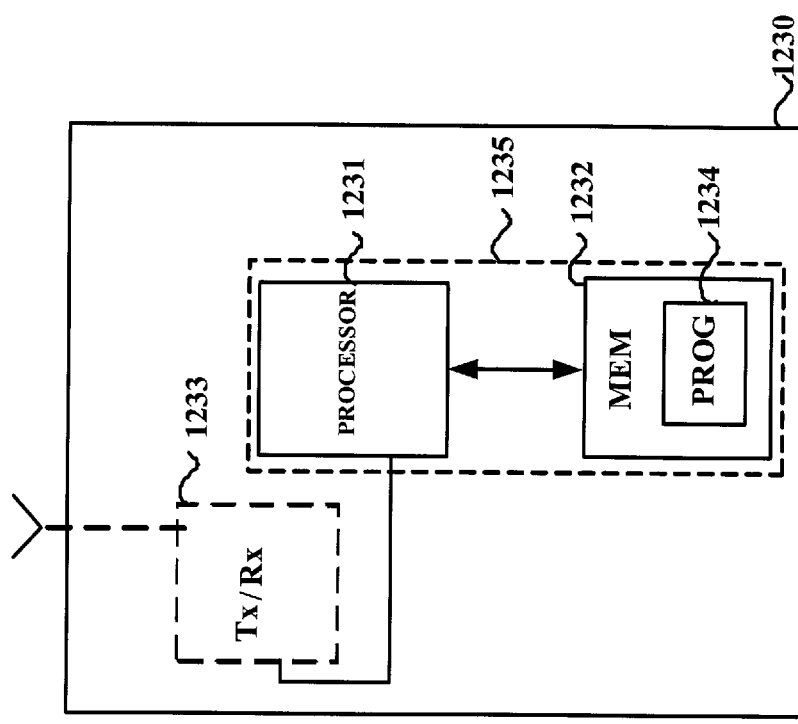

FIG. 12a illustrates a simplified block diagram of an apparatus 1210 that may be embodied in/as a server, e.g., the GCS AS 101 shown in FIG. 1, and an apparatus 1220 that may be embodied in/as a BM-CN, e.g., a BM-SC 102 shown in FIG. 1. FIG. 12b shows an apparatus 1230 that may be embodied in/as a RAN network node.

The apparatus 1210 may comprise at least one processor 1211, such as a data processor (DP) and at least one memory (MEM) 1212 coupled to the processor 1211. The apparatus 1210 may further comprise a transmitter TX and receiver RX 1213 coupled to the processor 1211. The MEM 1112 stores a program (PROG) 1214. The PROG 1114 may include instructions that, when executed on the associated processor 1211, enable the apparatus 1210 to operate in accordance with the embodiments of the present disclosure, for example to perform the method 300. A combination of the at least one processor 1211 and the at least one MEM 1212 may form processing means 1215 adapted to implement various embodiments of the present disclosure, for example method 300.

The apparatus 1220 comprises at least one processor 1221, such as a DP, and at least one MEM 1222 coupled to the processor 1221. The apparatus 1220 may further comprise a suitable TX/RX 1223 coupled to the processor 1221. The MEM 1222 stores a PROG 1224. The PROG 1224 may include instructions that, when executed on the associated processor 1221, enable the apparatus 1220 to operate in accordance with the embodiments of the present disclosure, for example to perform the method 400. A combination of the at least one processor 1221 and the at least one MEM 1222 may form processing means 1225 adapted to implement various embodiments of the present disclosure, for example method 400.

The apparatus 1230 comprises at least one processor 1231, such as a DP, and at least one MEM 1232 coupled to the processor 1231. The apparatus 1230 may further comprise a suitable TX/RX 1233 coupled to the processor 1231. The TX/RX 1233 may or may not connected to an antenna. The MEM 1232 stores a PROG 1234. The PROG 1234 may include instructions that, when executed on the associated processor 1231, enable the apparatus 1230 to operate in accordance with the embodiments of the present disclosure, for example to perform the method 500 or 600. A combination of the at least one processor 1231 and the at least one MEM 1232 may form processing means 1235 adapted to implement various embodiments of the present disclosure, for example method 500 or 600.

Various embodiments of the present disclosure may be implemented by computer program executable by one or more of the processors 1211, 1221 and 1231, software, firmware, hardware or in a combination thereof.

The MEMs 1212, 1222 and 1232 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1211, 1221 and 1231 may be of any type suitable to the local technical environment, and may include one or more of general purpose computers, special purpose computers, microprocessors, digital signal processors DSPs and processors based on multicore processor architecture, as non-limiting examples.

Although some embodiments are described in the context of an example network shown in FIGS. 1-2, it should not be construed as limiting the spirit and scope of the present disclosure. The principle and concept of the present disclosure may be more generally applicable to other network architectures.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, comprising:
   receiving, from a first broadcast/multicast control node (BM-CN), a first message for starting a first multimedia broadcast/multicast service (MBMS) session;
   receiving, from a second BM-CN, a second message for starting a second MBMS session, wherein the first BM-CN serves a first MBMS service area, and the second BM-CN serves a second MBMS service area partially overlapping with the first MBMS service area;
   detecting that the first MBMS session and the second MBMS session relate to a same MBMS user service delivered in an overlapping area of the first and second MBMS service areas;
   determining whether a single core network user plane connection and a single broadcast radio bearer can be established for the first and second MBMS sessions; and
   broadcasting data of the same MBMS user service over the single broadcast radio bearer to terminal devices, based on a positive result of the determination,
   wherein the method is at least partially implemented at a first network node of a radio access network.

2. The method according to claim 1, wherein said detecting is based on an indication included in at least one of the first message and the second message, the indication indicating a broadcast resource allocated by one of the first BM-CN and the second BM-CN, and a further related broadcast resource allocated by the other of the first BM-CN and the second BM-CN for the same MBMS user service.

3. The method according to claim 1, wherein the first BM-CN and the second BM-CN are a same BM-CN.

4. A method, comprising:
   receiving, from a first broadcast/multicast control node (BM-CN), a message for starting a first multimedia broadcast/multicast service (MBMS) session;
   receiving, from a second BM-CN, a further message for starting a second MBMS session, wherein the first BM-CN serves a first MBMS service area, and the second BM-CN serves a second MBMS service area partially overlapping with the first MBMS service area;
   detecting that the first MBMS session and the second MBMS session relate to a same MBMS user service delivered in an overlapping area of the first and second MBMS service areas;
   determining whether a single core network user plane connection and a single broadcast radio bearer can be established for the first and second MBMS sessions; and
   ordering a base station to establish the single core network user plane connection and broadcast data from the single core network user plane connection over the single broadcast radio bearer to terminal devices, based on a positive result of the determination,
   wherein at least partially implemented at a second network node of a radio access network.

5. The method according to claim 4, wherein the first BM-CN and the second BM-CN are a same BM-CN.

6. An apparatus, comprising:
   at least one processor; and
   at least one memory including computer program code;
   the at least one memory and the computer program code configured to, with the at least one processor, cause the apparatus at least to perform:
   receiving, from a first broadcast/multicast control node (BM-CN), a first message for starting a first multimedia broadcast/multicast service (MBMS) session;
   receiving, from a second BM-CN, a second message for starting a second MBMS session, wherein the first BM-CN serves a first MBMS service area, and the second BM-CN serves a second MBMS service area partially overlapping with the first MBMS service area;
   detecting that the first MBMS session and the second MBMS session relate to a same MBMS user service delivered in an overlapping area of the first and second MBMS service areas;
   determining whether a single core network user plane connection and a single broadcast radio bearer can be established for the first and second MBMS sessions; and
   broadcasting data of the same MBMS user service over the single broadcast radio bearer to terminal devices, based on a positive result of the determination,
   wherein the apparatus is at least partially implemented at a first network node of a radio access network.

7. The apparatus according to claim 6, wherein said detecting is based on an indication included in at least one of the first message and the second message, the indication indicating a broadcast resource allocated by one of the first BM-CN and the second BM-CN, and a further related broadcast resource allocated by the other of the first BM-CN and the second BM-CN for the same MBMS user service.

8. The apparatus according to claim 6, wherein the first BM-CN and the second BM-CN are a same BM-CN.

9. An apparatus, comprising:
   at least one processor; and
   at least one memory including computer program code;
   the at least one memory and the computer program code configured to, with the at least one processor, cause the apparatus at least to perform:
   receive, from a first broadcast/multicast control node (BM-CN), a first message for starting a first multimedia broadcast/multicast service (MBMS) session;
   receive, from a second BM-CN, a second message for starting a second MBMS session, wherein the first BM-CN serves a first MBMS service area, and the second BM-CN serves a second MBMS service area partially overlapping with the first MBMS service area;
   detect that the first MBMS session and the second MBMS session relate to a same MBMS user service delivered in an overlapping area of the first and second MBMS service areas;

determine whether a single core network user plane connection and a single broadcast radio bearer can be established for the first and second MBMS sessions; and order a base station to establish the single core network user plane connection and broadcast data from the single core network user plane connection over the single broadcast radio bearer to terminal devices, based on a positive result of the determination, wherein the apparatus is at least partially implemented at a second network node of a radio access network.

10. The apparatus according to claim 9, wherein the first BM-CN and the second BM-CN are a same BM-CN.

* * * * *